United States Patent
Stehl

[15] 3,688,415
[45] Sept. 5, 1972

[54] VIBRATION DEMONSTRATOR
[72] Inventor: George Stehl, Kew Gardens, N.Y.
[73] Assignee: Xerox Corporation, Rochester, N.Y.
[22] Filed: May 19, 1971
[21] Appl. No.: 144,935

[52] U.S. Cl. .............................................. 35/19 R
[51] Int. Cl. ........................................... G09b 23/08
[58] Field of Search ...... 35/19 R; 73/70, 70.2; 46/1 C

[56] References Cited

FOREIGN PATENTS OR APPLICATIONS

| 127,321 | 3/1932 | Austria | 73/70 |
| 403,484 | 12/1933 | Great Britain | 35/19 R |

OTHER PUBLICATIONS

"Vibration Demonstrator" page 327, of Welch Scientific Co. Catalog.
"Second Law of Motion Apparatus" page 131 of Stansi Scientific Div.

Primary Examiner—Harland S. Skogquist
Attorney—James J. Ralabate, William Kaufman and Barry Kramer

[57] ABSTRACT

An educational device for observing the physical characteristics of a vibrating mass comprises a generally planar shaped support base from which an elongated resilient body is supported in a parallel spaced apart plane, a receptacle mounted to the elongated body for receiving materials of different mass and an indicating means also supported from the base and proportioned with respect to the receptacle for providing an indication of movement of the receptacle through an equilibrium position when the resilient body is deflected and caused to vibrate.

8 Claims, 5 Drawing Figures

PATENTED SEP 5 1972
3,688,415
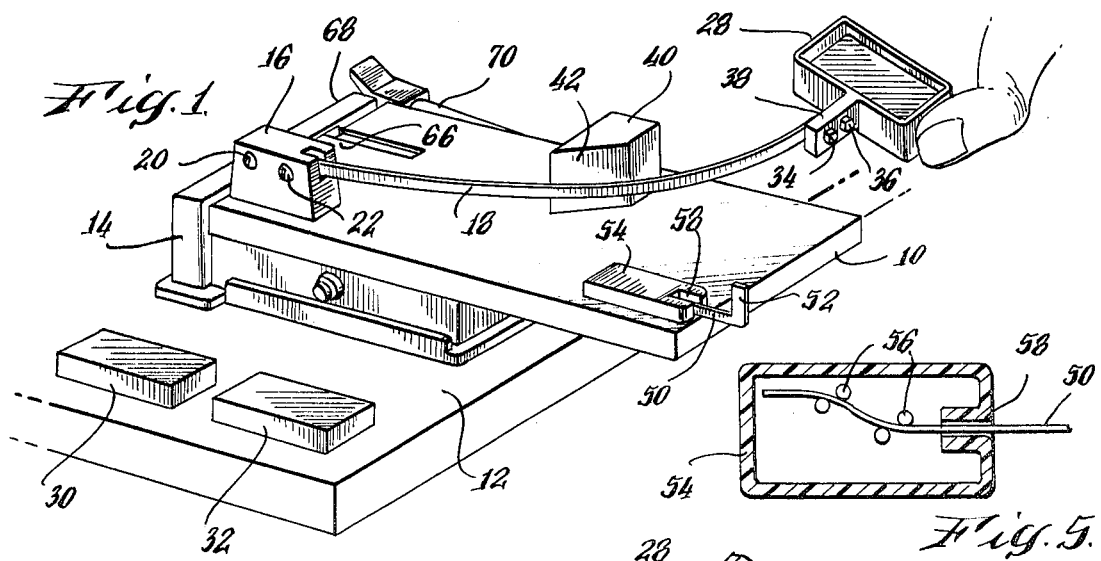
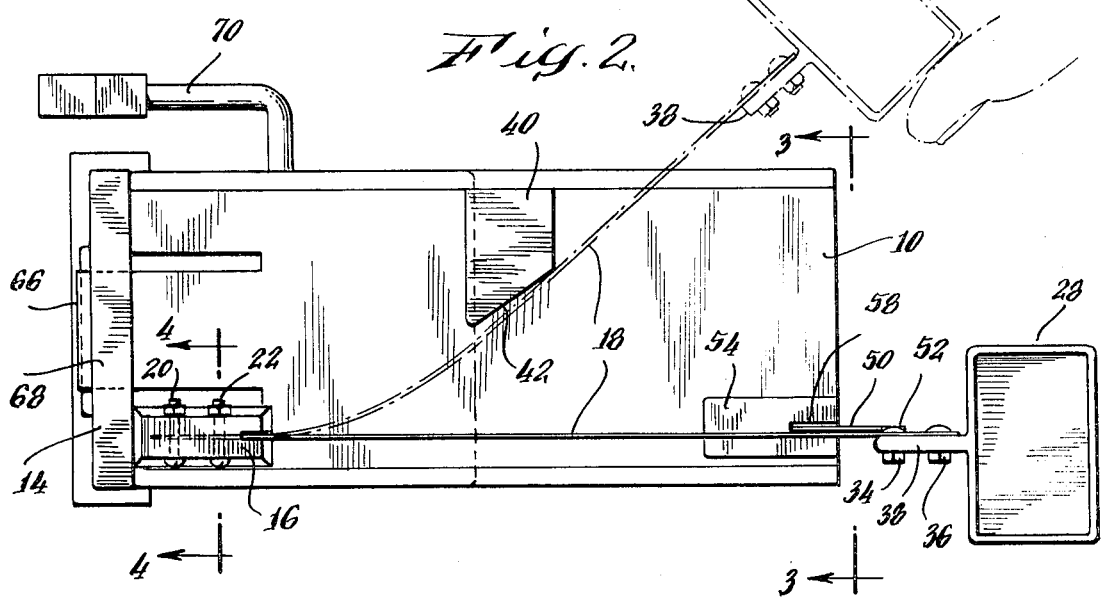
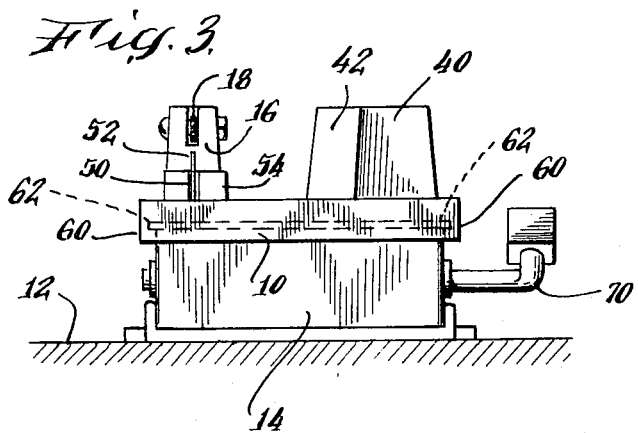
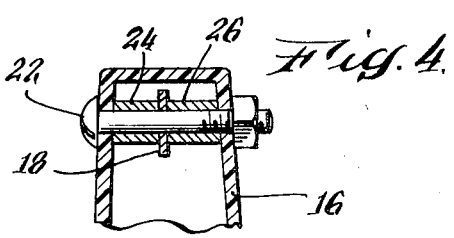
INVENTORS
Daniel November
George Stehl
BY William Kaufman
ATTORNEYS

VIBRATION DEMONSTRATOR

This invention relates to educational devices. The invention relates more particularly to an educational device for demonstrating the physical properties of a vibrating mass.

It is desirable to provide a device in educational systems for demonstrating various physical properties associated with a vibrating mass. For example, in the Process Approach to scientific education at grade school level as proposed by the American Association for the Advancement of Science, an exercise is suggested for providing an operational definition of mass. In this exercise, the mass of a vibrating body is altered in order to demonstrate inertia attributable to masses of different magnitudes and ultimately to aid the student in formulating a concept of mass. An educational device of this type is desirably relatively non-complex and rugged in design and readily portable for transport from location to location. Additionally, it is further desirable that the device include means for receiving bodies of different masses and in accordance with the technique of the exercise, provide a means for indicating the number of vibrations of the mass about a reference point during an interval of time.

Accordingly, it is an object of this invention to provide an educational device for demonstrating physical properties associated with the mass of a body.

Another object of the invention is to provide an educational device of the type described which is relatively non-complex, rugged and readily portable.

In accordance with the features of this invention, an educational device for observing the physical characteristics of a vibrating mass comprises a generally planar shaped support base from which an elongated resilient body is supported in a parallel spaced apart plane, a receptacle mounted to the elongated body for receiving materials of different mass and an indicating means also supported from the base and positioned with respect to the receptacle for providing an indication of movement of the receptacle through an equilibrium position when the resilient body is deflected and caused to vibrate.

These and other objects and features of the invention will become apparent with reference to the following specification and to the drawings wherein:

FIG. 1 is a perspective view of the educational device of this invention shown mounted on planar support surface and illustrating a mass receptacle in a deflected position for initiating vibrations of the receptacle;

FIG. 2 is a plan view of the educational device of FIG. 1 illustrating the mass receptacle in its furthermost deflected position and at its equilibrium position;

FIG. 3 is a view taken along lines 3—3 of FIG. 2;

FIG. 4 is a view taken along lines 4—4 of FIG. 3; and,

FIG. 5 is a bottom view of a portion of the support base illustrating a mounting means for an audible oscillation indicator.

Referring now to FIG. 1, the educational device in accordance with the features of this invention is shown to comprise an elongated generally planar shaped support base 10 which is mounted on a table-top surface 12 for example, by a suction mounting means represented generally as 14. The support base 10 which is preferably formed of plastic has integrally molded therewith a support means comprising a post 16 extending from the support base in a direction which is generally perpendicular to the plane of the base 10. The post 16 supports an elongated rectilinear shaped resilient body 18 which is preferably formed of a strip of metal such as spring steel and which has a length which is substantial greater than a width of this body. The resilient body 18 is supported at one end thereof on the post 16 by screws 20 and 22 which extend through the post and through apertures formed in the end of the body 18 and are secured to the post by associated nuts. The body 18 is centrally located within the interior of the post by spaces 24 and 26.

A receptacle 28 is provided and is mounted to another end of the body 18 for supporting bodies 30 and 32 of different masses. The receptacle is mounted to the resilient body 18 by screws 34 and 36 which extend through apertures in the body 18 and through apertures in a handle segment 38 of the receptacle 28. As illustrated in FIG. 2, the receptacle 28 and the resilient body 18 can be deflected from an equilibrium position to a deflection position from which location it is released and will vibrate or oscillate about the equilibrium position at a frequency corresponding to the mass of the receptacle and its contents. A deflection limiting member 40 is provided for establishing a reference station for deflection of the resilient body 18 in order that the receptacle 28 and its contents will be released from a station which provides the same amplitude of deflection from the equilibrium position for all tests. The limiting body is shown to be integrally molded with the support base 10 and includes a canted surface 42 which conforms to the shape of the resilient body 18 when deflected from its equilibrium position.

In order to indicate the frequency of oscillation or vibration of the receptacle and its contents, a vibration indicating means is provided and is positioned on the support base 10. The vibration indicating means is shown to include a body formed from a strip of thin plastic material 50 having an upstanding segment 52 which is positioned in the path of the receptacle 28. The plastic body 50 is supported by an integrally molded support body 54 having a plurality of studs 56 [FIG. 5] depending from an inner lower surface of the body 54. The indicator body 50 extends through an entrance aperture 58 in the body 54 and is guided in an offset path between the posts 56 which confine and restrain this indicating body. The body 50 is formed of a plastic material having a thickness which provides for deflection of the segment 52 when the receptacle 28 is released from its deflected position and oscillates about its equilibrium position. During each traversal of the equilibrium position during oscillation, the receptacle 28 will deflect the segment 52 thereby causing a clearly distinguishable sound useful in counting the number of traversals in a period of time and for determining the frequency or period of oscillation.

The educational device is mounted to a support surface 12 by the vacuum mounting means 14. Channels 60 [FIG. 3] which are formed in the base member 10 engage extending shoulders 62 of an upper surface on a housing 64 of the vacuum mounting means 14. A tab segment 66 of the base 10 extends through a window 68 in the vacuum mounting means 14 and engages the window frame for locking the educational device to the vacuum mount. The educational device can be demounted by depressing the tab 66 and simultaneously withdrawing the base 10 from the vacuum mount 14. The device 10 is therefore conveniently demountable from the vacuum mount for transporting from location to location and alternatively the entire unit can be demounted from the surface 12 by rotation of a lever arm 70 which operates on a surface 72 of the vacuum mount to release the vacuum. A vacuum mount of this type is shown and described in detail and is claimed in a copending U.S. patent application which is filed concurrently herewith and which is assigned to the assignee of this invention.

In operation, a body of particular mass is positioned in the receptacle; the receptacle is deflected to the surface 42 and released; and, the body is allowed to vibrate. The number of vibrations are counted by listening to the audible clicks for a predetermined interval of time. Bodies of different masses can be positioned in the receptacle and deflected in order to demonstrate frequency of vibration is inversely proportional to mass. In a particular exercise as proposed by the American Association for the Advancement of Science, a number of metallic washers are placed in the receptacle 28 and the number of vibrations for a predetermined period of time is plotted versus the number of washers in the receptacle. Students then formulate a concept of mass magnitude in terms of a number of particular units such as the washers. The mass of unknown bodies such as small stones and the like can be determined by vibrating these bodies in the receptacle and the equivalent number of washers is obtained from the curve of washers versus frequency. As this exercise progresses, the curve is calibrated in grams by vibrating bodies 30 and 32 of known mass. This exercise is explained in detail in "Science—A Process Approach/Part F, Defining Operationally Inertia and Mass" published by the American Association for the Advancement of Science.

An educational device for observing the physical characteristics of a vibrating mass has thus been described which is advantageously relatively non-complex and rugged, relatively low in cost, and which is adapted to receive bodies of different masses.

While we have illustrated and described a particular embodiment of our invention, it will be understood that various modifications may be made therein without departing from the spirit of the invention and the scope of the appended claims.

What is claimed is:

1. An educational device for observing the physical characteristics of a vibrating mass comprising:

an elongated generally planar shaped support base;

an elongated, rectilinear shaped resilient body having a width and having a length which is substantially greater than the width;

means extending from said support base in a direction generally perpendicular to the plane of said base for supporting said resilient body at one end of the resilient body in a plane generally parallel to and spaced apart from said support base whereby deflection of said resilient body from an equilibrium position and release thereof causes vibration of the body about the equilibrium position;

a receptacle rigidly mounted to said resilient body at another end thereof for receiving and retaining during vibrations material of differing mass; and, vibration indicating means positioned on said support base and actuated during movement of said receptacle for providing an indication of movement of said receptacle through the equilibrium position when said resilient body and receptacle are vibrated.

2. The device of claim 1 wherein a limiting body is provided and extends from said base limiting the deflection of said resilient body from the equilibrium position.

3. The device of claim 2 wherein said support base, said means for supporting said resilient body and said limiting body are integrally molded of a plastic material.

4. The device of claim 1 wherein said resilient body is formed of a strip of metal.

5. The device of claim 1 wherein said vibration indicating means is arranged to provide an audible indication.

6. The device of claim 5 wherein said audible indicating means comprises a body of material which is mounted on said base and positioned for deflection by the receptacle when said vibrating receptacle traverses the equilibrium position of said resilient body.

7. The device of claim 5 wherein said audible indicating means is supported on said base and positioned for deflection by said resilient body when said vibrating resilient body transverses the equilibrium position.

8. The device of claim 5 wherein said audible indicating means comprises a thin plastic body which is supported on the base and positioned in the path of the moving receptacle for deflection thereby, said indicating body having a thickness for providing an audible sound when deflected.

* * * * *